(No Model.)
2 Sheets—Sheet 2.
R. T. G. LÜDERS.
CLUTCH.
No. 498,884. Patented June 6, 1893.
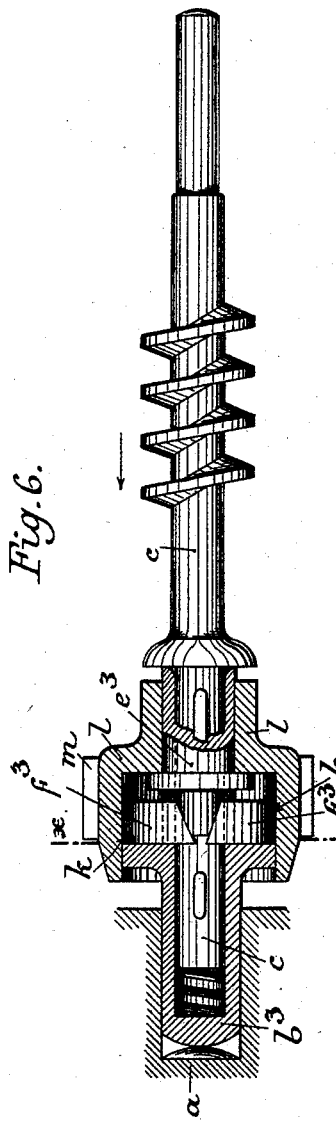
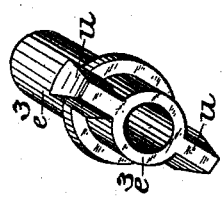
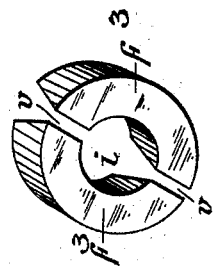
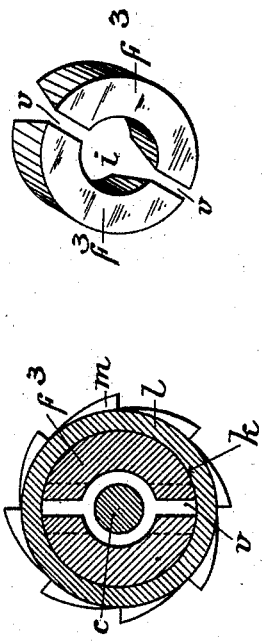
Witnesses:
E. K. Sturtevant.
E. A. Scott.
Inventor
Reinhold Theodor Gustav Lüders
by Richards
Attys

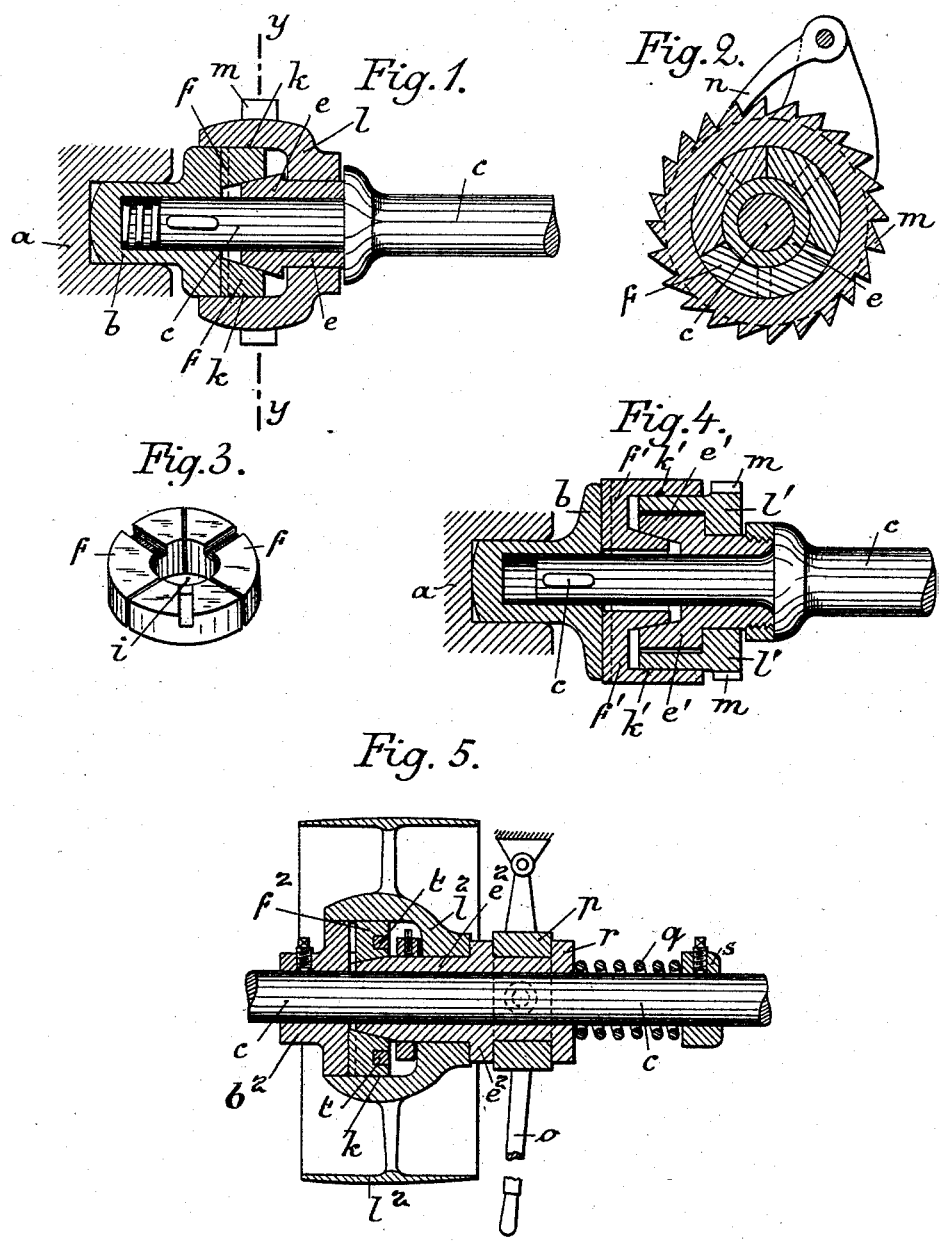

UNITED STATES PATENT OFFICE.

REINHOLD THEODOR GUSTAV LÜDERS, OF BERLIN, GERMANY.

CLUTCH.

SPECIFICATION forming part of Letters Patent No. 498,884, dated June 6, 1893.

Application filed October 8, 1892. Serial No. 448,228. (No model.) Patented in England January 26, 1892, No. 1,550.

*To all whom it may concern:*

Be it known that I, REINHOLD THEODOR GUSTAV LÜDERS, a subject of the Emperor of Germany, residing at Berlin, Germany, have invented certain new and useful Improvements in Clutches, (patented in England January 26, 1892, No. 1,550,) of which the following is a specification.

This invention relates to a brake apparatus for shafts that are subject to a load in the direction of their axes and which, while rotating freely in the one direction, are automatically locked or braked against rotation in the contrary direction, and can consequently only rotate in such direction on releasing a catch or braking device.

Figure 1 of the accompanying drawings shows the improved braking or locking apparatus in longitudinal section. Fig. 2 shows a cross section on line $y, y$, while Fig. 3 shows a perspective view of a detached part of the apparatus. Figs. 4 and 5 are sectional views of modifications. Fig. 6 is a sectional view of another modification and Figs. 7, 8 and 9 are detail views relating to the same.

$a$ and $b$ are respectively the end bearing and end socket for receiving the end of the axially loaded shaft $c$ which is fixed to the socket by a key so as to carry the latter round with it. On the shaft is a loose cone $e$ prevented from shifting longitudinally thereon, over which fits a ring $f$, which is preferably made in separate segments as shown at Fig. 3. This ring, which in the drawings is shown divided radially into three parts, is connected in any suitable manner either with the shaft or with the socket $b$, so as to rotate therewith; for example, as shown on the drawings, it may have radial ribs fitting into radial gooves on the socket. The bore $i$ of this ring $f$ is shaped so as to correspond with the configuration of the cone $e$, while its cylindrical periphery $k$, corresponds with the cylindrical bore of a ring $l$ mounted loose on the shaft $c$ but prevented from shifting longitudinally thereon. The ring $b$ can be prevented from rotating in one direction either by means of ratchet teeth $m$ formed thereon with which gears a stationary pawl $n$, or by any other suitable known ratchet or frictional brake appliance.

If the shaft $c$, which has longitudinal play in its socket $b$, is loaded in the direction of its axis, the cone $e$ will be made to expand the ring $f$ so as to cause its outer surface to be pressed against the internal surface of the ring $l$ with sufficient frictional force to prevent the shaft from being rotated by a force applied to it in that direction in which the ring $l$ is prevented from rotating by the pawl and ratchet but the shaft may rotate in that direction when the pawl is thrown out of gear with the ratchet teeth, or, if a frictional ratchet or brake is employed, when such frictional resistance is reduced to a sufficient extent. On the other hand, the shaft is always free to run in the contrary direction.

The construction shown in Figs. 1, 2 and 3 may be modified in such manner that the divided ring $f$ is pressed inward instead of outward in which case the part $e'$, Fig. 4, corresponding in effect to the cone $e$ of Fig. 1 is formed hollow instead of solid, and the frictional surface $k'$ of the divided ring is an internal cylindrical surface bearing upon the external surface of the ratchet ring $l'$ as shown at Fig. 4.

A further modification of the said brake apparatus consists in dispensing with the locking device consisting of the pawl $n$ and the ratchet-teeth $m$ and forming the ring $l$ as the boss of a belt pulley, a spur wheel or the like, so that the brake apparatus serves as a frictional coupling as shown at Fig. 5 where the pulley is marked $l^2$. In this modification the collar $s$ on the shaft $c$ behind the cone $e^2$ is shifted backward on the shaft far enough so that the cone $e^2$ can be moved backward and forward on the shaft so as to be put in and out of gear with the piece $f^2$ by means of a lever $o$ having a ring or fork $p$ engaging with the cylindrical collar of the cone. The end bearing $b$ of the previous arrangements is in this case formed into an abutment disk $b^2$ which is fixed to the shaft by a setting screw. For preventing the divided friction ring $f^2$ from being forced outward by centrifugal force against the internal periphery of the boss $l^2$ when the cone $e^2$ is out of gear and thus operate as a brake, a split spring ring $t$ may be inserted into a groove thereof, so as to draw together the parts of the ring $f$ when the cone $e$ has been withdrawn.

In order to keep the coupling in gear during working it is advisable to provide on the shaft $c$, a helical spring $g$, bearing at one end against the collar $s$ fixed on the shaft and with the other end against the end face of the cone $e^2$, so as to keep this in gear with the divided ring $f^2$.

A further device for the execution of the described brake is illustrated by Figs. 6–9. Here the ring $f^3$ does not consist of three parts, as is shown for instance in Fig. 3, but of two parts. Moreover the ring $f^3$ is not connected in this instance with the socket $b^3$, by radial wedges and grooves but rests with its smooth surface against the front surface of the socket $b^3$, which is smooth also. The expansion of the ring $f^3$ in order that its cylindrical circumferential surface shall rest against the cylindrical interior surface of the ring $l$ is not effected by the means of a conical socket $e$ which enters into the conical opening of the divided ring $f$ by the axial weight upon the shaft in the direction of the arrows, but by two wedge shaped additions $u$ which force their way between the slits $v$ of the ring $f^3$. In this case the socket $e^3$ must rest without revolving motion upon the shaft $c$.

The cone $e$ of Fig. 1, and the parts $e'$, $e^2$ and $e^3$ having the wedges $u$, all have inclined bearing surfaces and all these modifications are included in the broad terms "inclined bearing" as hereinafter used in the claims.

Having now described my invention, what I claim is—

1. In combination, in a braking or locking apparatus for shafts, the divided ring about the shaft, the inclined bearing on the shaft for operating the divided ring, the friction ring loosely arranged about the shaft to be engaged by the divided ring, and means for holding the friction ring against movement in one direction, substantially as described.

2. In combination, the shaft $c$ having the inclined bearing thereon, the socket for the end of the shaft, the divided ring about the shaft adjacent to the socket, the friction ring $l$ arranged loosely about the shaft to be engaged by the divided ring and the means for holding the friction ring against movement in one direction, substantially as described.

3. In combination, the shaft $c$ having the inclined bearing thereon, the divided ring around the shaft to be engaged by the said bearing, the parts of said ring having radial grooves, the friction ring about the divided ring, the socket about the shaft adjacent to the divided ring and the guides thereon, for the sections of said ring, substantially as described.

4. In combination the shaft, the divided ring movable radially thereof, the friction ring concentric with the divided ring and extending about the shaft, the inclined bearing carried by the shaft for engaging and operating the parts of the divided ring, the said shaft being arranged to have longitudinal movement and the bearing socket for the shaft, substantially as described.

In witness whereof I have hereunto set my hand in presence of two witnesses.

REINHOLD THEODOR GUSTAV LÜDERS.

Witnesses:
ALARD DU BOIS-REYMOND,
ALBERT KELLMANN.